United States Patent [19]

Rogers

[11] Patent Number: 4,998,554
[45] Date of Patent: Mar. 12, 1991

[54] FOOD PASTEURIZATION SYSTEM VACUUM BREAKER

[75] Inventor: Ronald J. Rogers, Fredericksburg, Iowa

[73] Assignee: Vacu-Purg, Inc., Fredericksburg, Iowa

[21] Appl. No.: 246,632

[22] Filed: Sep. 16, 1988

[51] Int. Cl.⁵ .............................................. F16K 24/00
[52] U.S. Cl. ................................... 137/217; 137/526; 137/542
[58] Field of Search ............... 99/453; 137/216.2, 217, 137/218, 526, 542

[56] References Cited

U.S. PATENT DOCUMENTS

| | | | |
|---|---|---|---|
| 84,425 | 11/1868 | Jones et al. | 137/526 X |
| 161,121 | 3/1875 | Hinkle | 137/217 |
| 204,135 | 5/1878 | Convery | 137/216.2 |
| 1,159,687 | 11/1915 | Kraft | 137/526 |
| 1,164,098 | 12/1915 | Kinsey | 137/526 |
| 1,407,136 | 2/1922 | Ehrhart . | |
| 1,589,453 | 6/1926 | Bach . | |
| 2,405,241 | 8/1946 | Smith | 137/526 |
| 2,505,376 | 4/1950 | Asselin | 137/526 |
| 2,696,193 | 12/1954 | Domingo | 119/14.01 |
| 2,706,488 | 4/1955 | Harrington | 137/116 |
| 2,869,571 | 1/1959 | Price et al. | 137/215 |
| 3,145,724 | 8/1964 | Pelzer | 137/217 |
| 3,483,884 | 12/1969 | Sullivan | 137/215 |
| 3,605,132 | 9/1971 | Lineback | 137/526 X |
| 3,791,401 | 2/1974 | Gorman | 137/216.2 |
| 3,870,066 | 3/1975 | Jurasek | 137/241 X |
| 4,273,153 | 6/1981 | Brown | 137/542 X |
| 4,627,599 | 12/1986 | Ehmig | 251/334 |

*Primary Examiner*—Gerald A. Michalsky
*Attorney, Agent, or Firm*—Zarley, McKee, Thomte, Voorhees & Sease

[57] ABSTRACT

A food pasteurization system includes a vacuum breaker valve having a valve element in an axial passageway normally maintained in a closed, raised position by a coil spring on the top side of the valve. Multipurpose drain and air openings are provided in the valve body and are positioned below the upper end of the valve passageway such that material moving upwardly through the valve is automatically drained out of the valve rather than back into the food conduit.

4 Claims, 2 Drawing Sheets

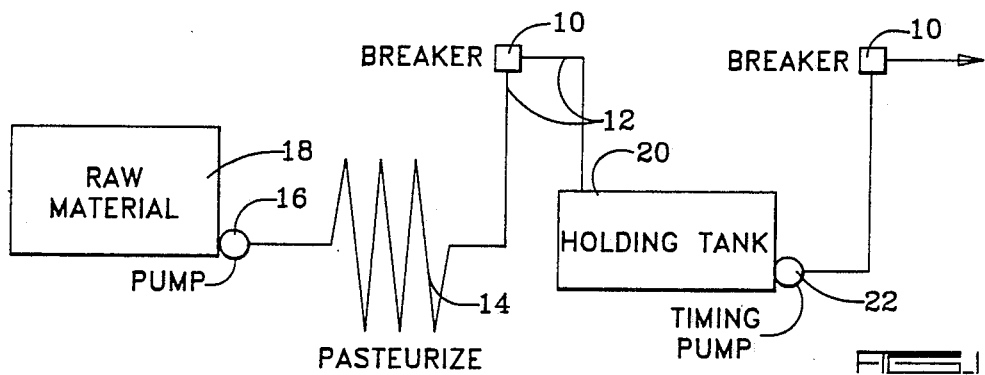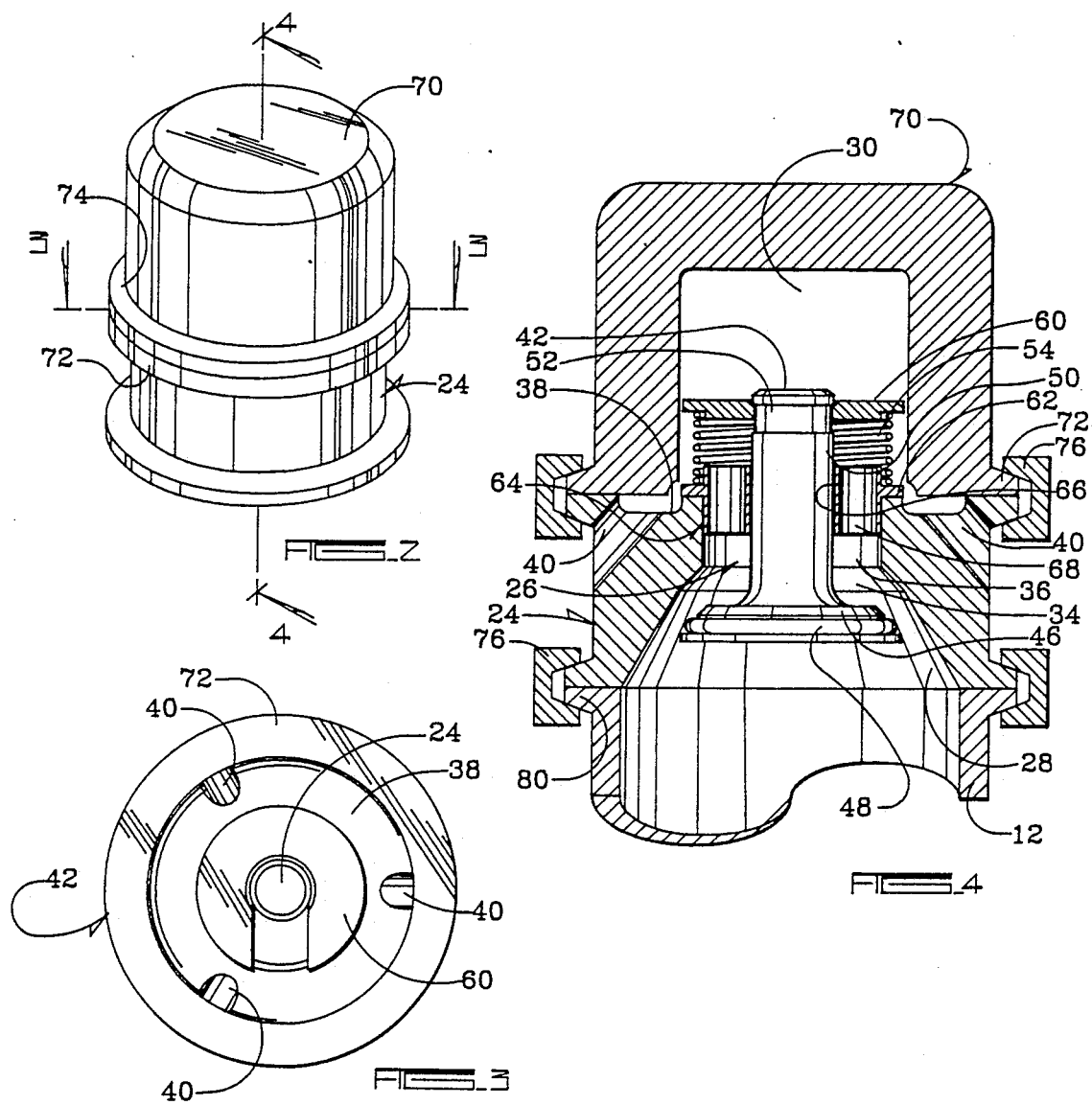

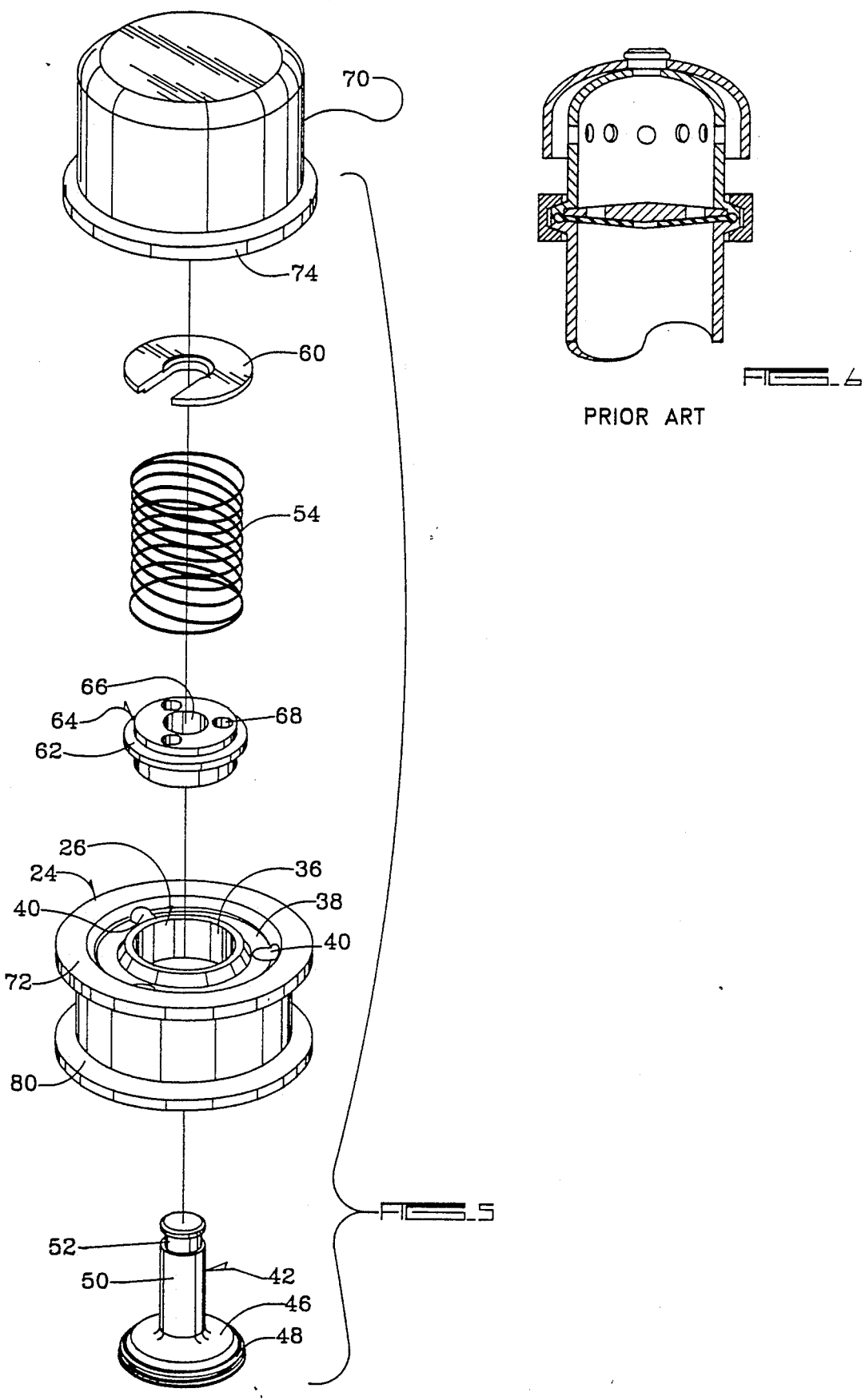

FOOD PASTEURIZATION SYSTEM VACUUM BREAKER

BACKGROUND OF THE INVENTION

Cleanliness and cleanability are two important objectives in the food processing industry involving food pasteurization. A problem area in this regard is the vacuum breaker, a representative drawing of which is shown in FIG. 6. The vacuum breaker will be placed between the raw material and the holding tank, for example, and when the system is shut down, it is important that the material in the connecting conduit be allowed to return by gravity to either the raw material source, if it has not been processed, and if it has been processed, moved on to the holding tank. It is important that unprocessed, raw material not flow on to the holding tank. Vacuum breakers currently being used do not have openings for draining material on the atmosphere side of the valve to the outside of the valve.

The operation of the vacuum breaker valve should be positive and the valve should be maintained in a normally closed position and adapted to open only when the system is shut down. The conventional vacuum breaker used in this industry suffers from not providing a positive shut-off when the system is operating, thereby allowing material being processed to flow through the valve and be splattered all over it and outside the valve. The cleaning on the inside and outside of the vacuum breaker valve is a continuous, ongoing chore. A particular problem is that material being processed accumulates on the atmosphere side of the valve element and the cover must be removed to clean the valve. If this material is not removed from the atmosphere side of the valve, it will then drain back into the food processing conduit, thereby contaminating the food being processed.

SUMMARY OF THE INVENTION

The vacuum breaker of this invention has a positive shut-off and is substantially self-cleaning. The valve element is positioned in an axial, vertical passageway on the food product side of the valve, and the valve stem includes a spring on the atmosphere side which normally maintains the valve element in a closed position. When the system is shut down, the atmospheric pressure overcomes the action of the spring to open the valve and equalize the pressure in the food processing conduit.

The flow of material through the valve from the food processing conduit is minimized, but to the extent any material does reach the atmosphere side of the valve, it is immediately drained off outside the valve rather than back into the food processing conduit. The drain openings are below the upper end of the passageway on the atmosphere side, and thus will automatically drain any material moving upwardly through the passageway. The drain openings have a dual function. The second function is to allow atmospheric air to pass into the valve and through the passageway to equalize air pressure in the conduit.

A circular channel is provided having spaced-apart drain openings extending to the outside of the valve body. A cover is provided which otherwise completely closes the top of the valve.

The valve element moves in a frusto-conical passageway on the bottom side which facilitates self-cleaning as air passes from the atmosphere through the passageway past the valve element.

DESCRIPTION OF THE DRAWINGS

FIG. 1 is a schematic view of the food pasteurization system utilizing the vacuum breaker of this invention.

FIG. 2 is a perspective view of the vacuum breaker unit.

FIG. 3 is a cross-sectional view taken along line 3—3 in FIG. 2.

FIG. 4 is a cross-sectional view taken along line 4—4 in FIG. 2 showing the valve element in its open position.

FIG. 5 is an exploded, perspective view of the vacuum breaker.

FIG. 6 is a cross-sectional view of a prior art device.

DESCRIPTION OF THE PREFERRED EMBODIMENT

The vacuum breaker of this invention is referred to generally in FIG. 2 by the reference numeral 10. In FIG. 1, a representative use of the vacuum breaker 10 is shown with it being in a conduit 12 connected to a pasteurization unit 14 in turn connected to a pump 16 and a raw material tank 18. The processed food is received in a holding tank 20 which in turn is connected through a timing pump 22 to a second vacuum breaker 10.

The vacuum breaker 10 includes a valve body 24 having an axial passageway 26 extending between a bottom food side 28 and a chamber 30. A frusto-conical wall portion 32 is provided on the bottom side and merges into a valve seat 34 which in turn merges into a cylindrical passageway 36. The top side of the valve body 24 which defines a bottom wall 38 forming an annular, concentric channel with spaced-apart drain openings 40 extending therefrom to the outside of the valve body, as seen in FIG. 4. It is seen that the bottom wall 38 and the drain openings 40 are below the upper end of the passageway 26 and thus, any material passing upwardly through the passageway 26 will naturally gravitate into the channel and be discharged through the drain openings 40. The openings 40 also function as air inlet openings when the air pressure in the conduit 12 drops when the system is shut down, thereby allowing air to move downwardly through the passageway 26.

A valve element 42 is provided which includes a head 46 having an O-ring 48. The head is connected to a valve stem 50 having an annular retainer channel 52 on its upper end. The valve element 42 is positioned in the passageway 26 such that the head 46 and the O-ring 48 engage the valve seat 34 when the valve element is in its raised closed position. A coil closure spring 54 is positioned on the valve stem on the upper side of the valve body 24 to normally maintain the valve element 42 in its raised closed position. A retainer disk 60 is received in the retainer channel 52 and holds the spring 54 against the shoulder or flange 62 of a valve guide 64 positioned in the passageway 26. The valve guide 64 includes a center axial opening 66 in which the stem 50 is received. Passageway openings 68 extend through the valve guide 64 for communication between the top and bottom sides of the valve body in the passageway 26. The shoulder flange 62 also rests on top of the upper end of the passageway 26 wall 70 while a portion of the valve guide extends into the passageway 26, as seen in FIG. 4.

The valve guide 64 may alternately be an integral part of the valve body 24.

A closed cover 70 is placed over the top of the valve body, thereby sealing off the atmosphere side of the valve body except for the drain and air openings 40 in the valve body which communicate with the atmosphere.

The valve body 24 and the cover 70 include abutting, outwardly-extending, annular flanges 72 and 74 which are engaged by a clamp 76 to lock the cover to the valve body. A similar clamp 76 engages a second mounting flange 80 on the lower end of the valve body to couple it to the conduit 12.

Thus, in operation the valve element 42 will normally be in its closed position held by the spring 54. The positive pressure in the conduit 12 further moves the valve element to its closed position. Upon the pasteurization system being shut down, the pressure in the conduit 12 will drop and atmospheric pressure will enter through the openings 40 and cause the valve element to move downwardly to its open position, as seen in FIG. 4, thereby allowing material in the conduit to flow by gravity downwardly. A positive on/off action will occur thereby minimizing any tendency of material to flow upwardly through the passageway 26 into the cover 70. Any material that does flow into the cover 70 will automatically be discharged by gravity through the drain openings 40 which are below the upper end of the passageway 26 such that the valve will be self-cleaning. Air from the atmosphere will enter the valve passageway 26 through the openings 40 and move past the valve head 46 and the passageway side wall portions 32 and 34, thereby also cleaning this area of the valve. It is seen that any material that flows into the cover 70 will not flow back into the conduit 12 through the valve but instead will be drained off outside the valve due to the location of the multi-purpose openings 40.

Should cleaning be necessary, the valve may be easily disassembled and cleaned and re-assembled through operation of the clamps 76 and removal of the retainer disk 60 holding the valve element 42 in the passageway 26 and connected to the valve guide 64 and the spring 54.

What is claimed is:

1. A food pasteurization system including a raw material supply connected by a conduit to a pasteurization unit connected to a processed food holding tank, and a vacuum breaker positioned in said conduit between said supply and holding tank wherein the improvement includes said vacuum breaker comprising:

a valve body having a vertical passageway extending therethrough, between said conduit at its lower end and a chamber in communication with the atmosphere at its upper end, a valve seat in said passageway, said chamber having a normal pressure approximately equal to the atmospheric pressure, said valve body having oppositely disposed annular flanges at its lower and upper ends, said upper end including an annular channel having a drain opening in communication with the atmosphere and positioned at least as low as the upper end of said passageway whereby all material flowing upwardly through said passageway from said conduit is drained from said annular channel, a cover having said chamber therein and an annular flange positioned on the upper end of said valve body with said cover flange matingly engaging said upper end valve body flange and locking means releasably locking said cover and upper body flanges together and said conduit having an annular flange in mating engagement with the valve body lower end annular flange and locking means releasably locking said conduit and lower end valve body annular flange together, a valve element movable between open and closed position in said passageway with said valve element engaging said valve seat when said element is in said closed position, and a spring engaging said valve element for normally closing said passageway but allowing the valve element to move to an open position when pressure in said conduit is reduced relative to said atmospheric pressure thereby allowing air pressure equalization to occur in said conduit.

2. The structure of claim 1 and said passageway at the lower end having a continuous sidewall which uniformly tapers upwardly and laterally inwardly and merges into said valve seat whereby said passageway below said valve element is self cleaning as material in said conduit moves over said tapered sidewall as said material moves through said conduit.

3. A food pasteurization system including a raw material supply connected by a conduit to a pasteurization unit connected to a processed food holding tank, and a vacuum breaker positioned in said conduit between said supply and holding tank wherein the improvement includes said vacuum breaker comprising:

a valve body having a vertical passageway extending therethrough, between said conduit at its lower end and a chamber in communication with the atmosphere at its upper end, a valve seat in said passageway, said chamber having a normal pressure approximately equal to the atmospheric pressure, said valve body having oppositely disposed annular flanges at its lower and upper ends, said upper end including an annular channel having a drain opening in communication with the atmosphere and positioned at least as low as the upper end of said passageway whereby all material flowing upwardly through said passageway from said conduit is drained from said annular channel, a cover having said chamber therein and an annular flange positioned on the upper end of said valve body with said cover flange matingly engaging said upper end valve body flange and locking means releasably locking said cover and upper body flanges together and said conduit having an annular flange in mating engagement with the valve body lower end annular flange and locking means releasably locking said conduit and lower end valve body annular flange together, a valve element movable between open and closed positions in said passageway with said valve element engaging said valve seat when said valve element is in said closed position, and said valve element adapted for closing said passageway but being able to move to an open position when pressure in said conduit is reduced relative to said atmospheric pressure thereby allowing air pressure equalization to occur in said conduit.

4. The structure of claim 3 and said passageway at the lower end having a continuous sidewall which uniformly tapers upwardly and laterally inwardly and merges into said valve seat whereby said passageway below said valve element is self cleaning as material in said conduit moves over said tapered sidewall as said material moves through said conduit.

* * * * *